US012683137B2

(12) United States Patent
Sychev et al.

(10) Patent No.: US 12,683,137 B2
(45) Date of Patent: Jul. 14, 2026

(54) ALL-OPTICAL SINGLE-PHOTON DETECTOR

(71) Applicant: Purdue Research Foundation, West Lafayette, IN (US)

(72) Inventors: Demid V. Sychev, West Lafayette, IN (US); Vladimir M. Shalaev, West Lafayette, IN (US); Alexandra Boltasseva, West Lafayette, IN (US); Peigang Chen, West Lafayette, IN (US); Morris Menghuan Yang, West Lafayette, IN (US); Colton B. Fruhling, Lafayette, IN (US); Alexei Lagutchev, West Lafayette, IN (US); Alexander V. Kildishev, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 236 days.

(21) Appl. No.: 18/644,360

(22) Filed: Apr. 24, 2024

(65) Prior Publication Data

US 2024/0355602 A1 Oct. 24, 2024

Related U.S. Application Data

(60) Provisional application No. 63/461,564, filed on Apr. 24, 2023.

(51) Int. Cl.
*H01J 43/04* (2006.01)

(52) U.S. Cl.
CPC .................................... *H01J 43/04* (2013.01)

(58) Field of Classification Search
CPC ...... H01J 43/04; H01J 1/32; H01J 2237/2445; H01J 2231/5001; H10F 30/22; H10F 77/959; G01R 31/311; G01R 31/307; G01S 17/34; G01S 17/10; G01S 7/4814; G01S 7/484; G01S 7/4863; G01S 7/4865; G01S 7/4811
See application file for complete search history.

(56) References Cited

FOREIGN PATENT DOCUMENTS

CN 112840466 B * 10/2024 ......... H10F 30/2255

OTHER PUBLICATIONS

Sinatkas et al., Electro-optic modulation in integrated photonics. J. Appl. Phys. 130, (2021).
Zasedatelev et al., Single-photon nonlinearity at room temperature. Nature 597, 493-497 (2021).
(Continued)

*Primary Examiner* — Don K Wong
(74) *Attorney, Agent, or Firm* — Piroozi-IP, LLC

(57) ABSTRACT

An ultrafast system for detecting incidence of a single photon is disclosed which includes a single photon avalanche detector having an inherent bandgap, a source of probe light configured to apply an incident beam onto the single photon avalanche detector, wherein the probe light is configured to apply energy less than the bandgap, and a probe beam detector, configured to receive a reflected probe beam from the single photon avalanche detector, wherein the probe beam detector is adapted to generate a signal signifying: i) incidence of a single photon from a control beam onto the single photon avalanche detector.

23 Claims, 10 Drawing Sheets

(56) References Cited

OTHER PUBLICATIONS

Mckay. Avalanche Breakdown in Silicon. Phys. Rev. 94, 877-884 (1954).
Lee et al., Giant nonlinear optical responses from photon-avalanching nanoparticles. Nature 589, 230-235 (2021).
Bhaskar et al., Experimental demonstration of memory-enhanced quantum communication. Nature 580, 60-64 (2020).
Furusawa et al., Unconditional quantum teleportation. Science (80-. ). 282, 706-709 (1998).
Reshef et al., Nonlinear optical effects in epsilon-near-zero media. Nat. Rev. Mater. 4, 535-551 (2019).
Kinsey et al., Near-zero-index materials for photonics. Nat. Rev. Mater. 4, 742-760 (2019).
Yoshiki et al., All-optical switching using Kerr effect in a silica toroid microcavity. Opt. Express 22, 24332 (2014).
Raja et al., Ultrafast optical circuit switching for data centers using integrated soliton microcombs. Nat. Commun. 12, 1-7 (2021).
Lee et al., High gain, low noise 1550 nm GaAsSb/AlGaAsSb avalanche photodiodes. Optica 10, 147 (2023).
Reiserer et al., Nondestructive Detection of an Optical Photon. Science (80-. ). 342, 1349-1351 (2013).
Dayan et al., A Photon Turnstile Dynamically Regulated by One Atom. Science (80-. ). 319, 22-25 (2008).
Shomroni et al., All-optical routing of single photons by a one-atom switch controlled by a single photon. Science (80-. ). 345, 903-906 (2014).
Aoki et al., Observation of strong coupling between one atom and a monolithic microresonator. Nature 443, 671-674 (2006).
Volz et al., Ultrafast all-optical switching by single photons. Nat. Photonics 6, 605-609 (2012).
Reithmaier et al., Strong coupling in a single quantum dot-semiconductor microcavity system. Nature 432, 197-200 (2004).
Englund et al., Controlling cavity reflectivity with a single quantum dot. Nature 450, 857-861 (2007).
Sun et al., A single-photon switch and transistor enabled by a solid-state quantum memory. Science (80-. ). 361, 57-60 (2018).
Javadi et al., Single-photon non-linear optics with a quantum dot in a waveguide. Nat. Commun. 6, 8655 (2015).
Almeida et al., All-optical switching on a silicon chip. Optics Letters, vol. 29, No. 24, Dec. 15, 2004.
Haitz et al., Avalanche Effects in Silicon p-n Junctions. I. Localized Photomultiplication Studies on Microplasmas. J. Appl. Phys. 34, 1581-1590 (1963).
Soref et al., Electrooptical effects in silicon. IEEE J. Quantum Electron. 23, 123-129 (1987).
Reed et al., Silicon optical modulators. Nat. Photonics 4, 518-526 (2010).
Kindereit, Fundamentals and future applications of laser voltage probing. IEEE Int. Reliab. Phys. Symp. Proc. 3F.1.1-3F.1.11 (2014).
Ganesh, Laser Voltage Probing (LVP)—Its value and the race against scaling. Microelectron. Reliab. 64, 294-298 (2016).
Yairi et al., Optically controlled optical gate with an optoelectronic dual diode structure—Theory and experiment. Opt. Quantum Electron. 33, 1035-1054 (2001).
Segev et al., Photorefractive Gunn Effect. Phys. Rev. Lett. 76, 3798-3801 (1996).
Eisaman et al., Invited Review Article: Single-photon sources and detectors. Rev. Sci. Instrum. 82, 071101 (2011).
Stringer, Thyristor DC systems for non-ferrous hot line. IEEE Ind. Static Power Control 6-10 (1965).
Logan et al., Avalanche breakdown in gallium arsenide p-N junctions. Phys. Rev. 128, 2518-2523 (1962).
Stipčević et al., Advanced active quenching circuit for ultra-fast quantum cryptography. Opt. Express 25, 21861 (2017).
Li, Refractive index of silicon and germanium and its wavelength and temperature derivatives. J. Phys. Chem. Ref. Data 9, 561-658 (1980).
Aull et al., Geiger-Mode Avalanche Photodiodes for Three Dimensional Imaging. Lincoln Lab. J. 13, (2002).
Gupta et al., Subpicosecond carrier lifetime in GaAs grown by molecular beam epitaxy at low temperatures. Appl. Phys. Lett. 59, 3276-3278 (1991).
Lin et al., Monolithically integrated, broadband, high-efficiency silicon nitride-on-silicon waveguide photodetectors in a visible-light integrated photonics platform. Nat. Commun. 13, 6362 (2022).
Vahala et al., Optical microcavities. Nature 424, 839-846 (2003).
Clerici et al., Controlling hybrid nonlinearities in transparent conducting oxides via two-colour excitation. Nat. Commun. 8, 15829 (2017).

* cited by examiner

ALL-OPTICAL SINGLE-PHOTON DETECTOR

CROSS-REFERENCE TO RELATED APPLICATIONS

The present non-provisional patent application is related to and claims the priority benefit of U.S. Provisional Patent Application Ser. No. 63/461,564, entitled ALL-OPTICAL SINGLE-PHOTON DETECTOR, which was filed Apr. 24, 2023, the contents of which are hereby incorporated by reference in its entirety into the present disclosure.

STATEMENT REGARDING GOVERNMENT FUNDING

This invention was made with government support under DMR 1747426, ECCS 2015025 awarded by the National Science Foundation and under DE-AC05-00OR22725 awarded by the Department of Energy. The government has certain rights in the invention.

TECHNICAL FIELD

This disclosure relates to a system and method for single photon detection, and in particular, to an all-optical system and method for single photon detection based on an avalanche regime.

BACKGROUND

This section introduces aspects that may help facilitate a better understanding of the disclosure. Accordingly, these statements are to be read in this light and are not to be understood as admissions about what is or is not prior art.

Single photon detection has brought a significant amount of interest in various fields such as Fiber-optic communication, optics-based processing, quantum encryption, medical imaging, particle separation and accounting, and DNA sequencing just to name a few. Single photon detection promises great advances given the potential for extra fast latencies. However, typically while optical sensors are utilized to detect a single photon incidence on such sensors, electronics are deployed to determine the incidence. Since electronics inherently have long latencies as compared to optical latencies, the opto-electronic advances have been slow.

Therefore, there is an unmet need for a novel approach to reduce latencies when detecting single photon incidence.

SUMMARY

An ultrafast system for detecting incidence of a single photon is disclosed. The system includes a single photon avalanche detector having an inherent bandgap, a source of probe light configured to apply an incident beam onto the single photon avalanche detector, wherein the probe light is configured to apply energy less than the bandgap, and a probe beam detector, configured to receive a reflected probe beam from the single photon avalanche detector. The probe beam detector is adapted to generate a signal signifying: i) incidence of a single photon onto the single photon avalanche detector based on changes to concentration of free electrons in the single photon avalanche detector as a result of the onset of an avalanche regime, and ii) modulation of the reflected probe beam as a result of the changes to the concentration of free electrons in the single photon avalanche detector as a result of the onset of the avalanche regime.

A method of detecting an incidence of a single photon onto a device is also disclosed. The method includes applying a probe light onto a device having a bandgap, wherein the device includes a P-N junction maintained in a reverse bias and adapted to initiate an avalanche mode of freeing valence electrons and holes based on incidence of a single photon thereon. The probe light is configured to apply energy less than the bandgap. The method also includes receiving the reflected probe light from the device by a probe light detector, and applying a single photon from a control beam to the device. Furthermore, the method includes detecting changes in the device by the probe light detector as the device goes into an avalanche regime. The changes correspond to a time delay between the incidence of the single photon onto the device causing a change in concentration of free electrons and holes in the device.

Another method of detecting modulations of optical properties of a device is also disclosed. The method includes applying a probe light onto a device having a bandgap, wherein the device includes a P-N junction maintained in a reverse bias and adapted to initiate an avalanche regime of freeing valence electrons and holes based on the incidence of a single photon thereon. The probe light is configured to apply energy less than the bandgap. The method also includes receiving reflected probe light from the device by probe light detector and applying a single photon from a control beam to the device. Furthermore, the method includes detecting fast modulations in the reflected probe light as the device initiates an avalanche regime. The modulations correspond to changes in the device in response to the incidence of the single photon.

DETAILED DESCRIPTION

Figure 1A:
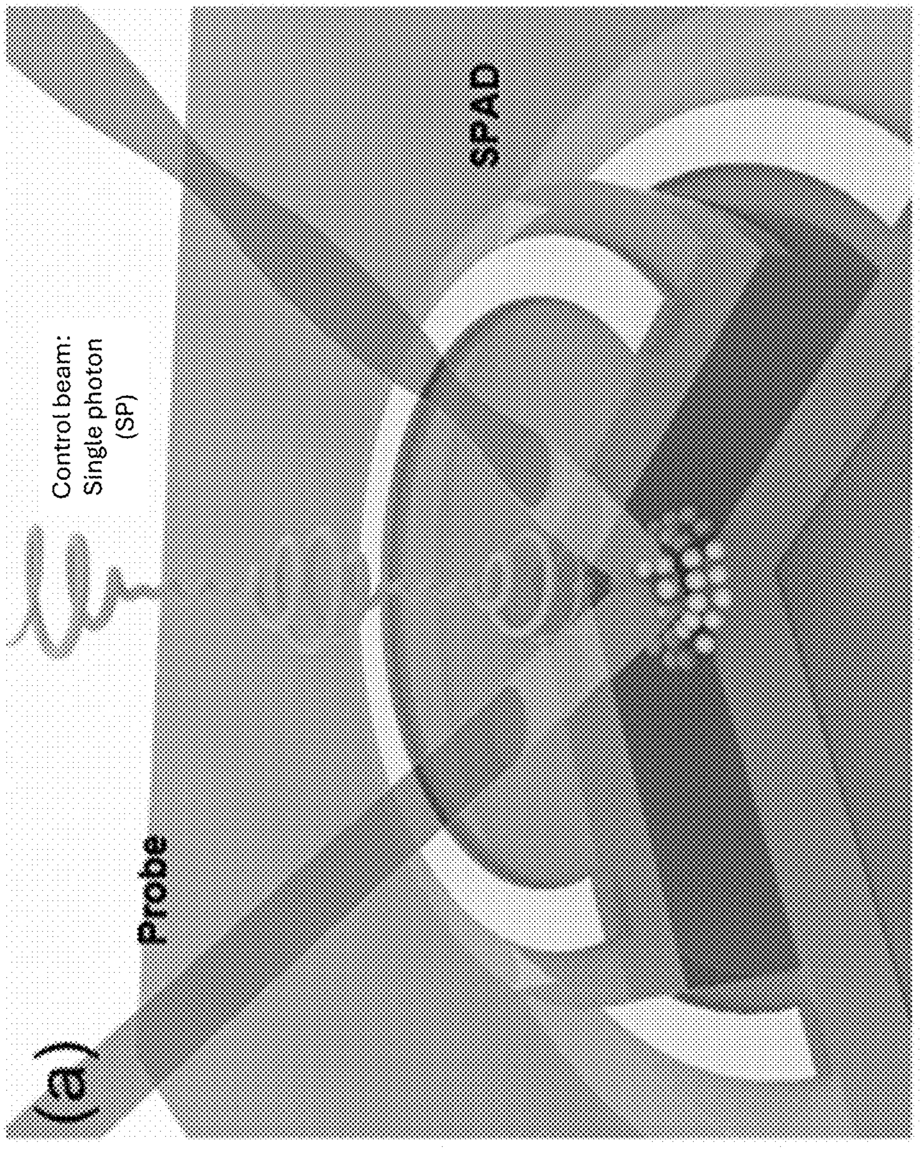
FIG. 1*a* is a schematic of a phenomenon that forms the basis of the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

A novel approach is disclosed herein to reduce latencies when detecting single photon incidence. Towards this end, the present disclosure takes advantage of distinctive characteristics of light such as high-speed propagation, low-loss, low cross-talk and low power consumption as well as quantum properties, to significantly reduce latencies in detecting incidence of a single photon on a surface or a sensor. Such improvement makes it uniquely possible for significant improvement for various critical applications in communication, high-resolution imaging, optical computing, and emerging quantum information technologies. To achieve this improvement, one limiting factor though is the weak optical nonlinearity of conventional media that poses challenges for the control and manipulation of light, especially with ultra-low, few-photon-level intensities. Thus, the present disclosure, provides an all-optical solution based on modulation of a probing light used to detect single photon incidence. Such ultra-low latency probe beam modulation detection is enabled by the electron avalanche process in a semiconductor triggered by the impact ionization of charge carriers. This scheme corresponds to achieving a nonlinear refractive index of $n_2 \sim 7\times10^{-3}$ m$^2$/W, which is several orders of magnitude higher compared to best nonlinear optical materials (see Table 1 below).

The approach presented herein opens up the possibility of terahertz-speed optical switching at the single-photon level, which thus enabling novel photonic devices and future quantum photonic information processing and computing, fast logic gates, and beyond. Importantly, this approach could lead to industry-ready CMOS-compatible and chip-integrated optical modulation platforms operating with single photons.

TABLE 1

Summary table for optical nonlinear coefficient $n_2$ for different materials

| Material/work | $n_2$, $m^2W^{-1}$ | Probe wavelength, nm |
|---|---|---|
| Present disclosure | $7 \times 10^{-3}$ | 1550 |
| Gold | $2.6 \times 10^{-14}$ | 532 |
| AZO | $5.2 \times 10^{-16}$ | 1311 |
| ITO | $1.1 \times 10^{-14}$ | 1240 |
| TDBC | $1.7 \times 10^{-14}$ | 500 |
| HTJSq | $3.5 \times 10^{-15}$ | 564 |

TABLE 1-continued

Summary table for optical nonlinear coefficient $n_2$ for different materials

| Material/work | $n_2$, $m^2W^{-1}$ | Probe wavelength, nm |
|---|---|---|
| Silicon | $5 \times 10^{-18}$ | 1500 |
| Fiber | $2.9 \times 10^{-20}$ | 1500 |
| CS | $2.3 \times 10^{-14}$ | N/A |
| Cold atoms(EIT, BEC) | $2.0 \times 10^{-5}$ | 589 |
| Fluorescein dye in glass | $3.5 \times 10^{-7}$ | 488 |
| Polymer PTS | $-2.0 \times 10^{-14}$ | 650-700 |
| LBO | $0.26 \times 10^{-19}$ | 780 |
| Lithium Niobate | $2.5 \times 10^{-19}$ | 532 |
| Atomic Rb | about $10^{-10}$ | 780 |

The basis for the present disclosure comes from realizing strong light-induced optical modulation due to even a single photon incidence on material with avalanche susceptibility. A single photon avalanche diode (SPAD), also known as a Geiger-mode avalanche photodiode, includes a p-n junction that in the presence of an electric field and an incident photon enters an avalanche mode thus exponentially freeing electrons from valence bands. Such an event (i.e., exponential freeing of electrons) is referred to herein as the avalanche regime.

The onset of the avalanche regime is detected by a probing light shone on the surface of a single photon detector sensor and reflected therefrom. The reflected probing light modulates as a result of physical changes in the sensor due to the onset of the avalanche regime. The modulation of light by a beam with a relatively low optical power typically requires very special conditions. Thus, the present disclosure provides a novel approach to utilize an avalanche multiplication process in a semiconductor to significantly alter the refractive index of a medium (silicon). Using this effect, we demonstrate the modulation of light by generating high concentrations of free carriers in a silicon photodiode structure using single-photon intensities of a control beam.

Referring to FIG. 1*a*, a schematic of a phenomenon that forms the basis of the present disclosure is provided. Accordingly, the basis for the present disclosure is: if a single electron is injected somehow into the conduction band of a semiconductor, which is placed in a high enough external electric field, it starts a process of generation of more and more electrons as in a chain reaction causing avalanche of new charge carriers in a conduction band. This process is so significant that even the injection of a single electron can cause the creation of up to a few millions of new charge carriers. The freeing of electrons can be induced through the process of photon absorption. This same process is used for single-photon detection in a SPAD, where the avalanche process is read out electrically. Advantageously, significant changes in charge carriers cause changes not only in resistance but in the refractive index of a material as well. This change in the refractive index provides the basis of the present disclosure to use this effect for an all-optical modulation detection to establish an ultra-low latency single photon detection, where a photon-induced avalanche is being detected optically by another beam.

The onset of the avalanche regime significantly influences the refractive index and absorption of a semiconductor vis-à-vis a significant change in the concentration of free charge carriers, i.e., by electrons and holes. When an external light source with photons that have energy higher than the bandgap interacts with said semiconductor, it excites electrons from the valence band to the conduction band, thus altering the concentration of free charge carriers and subsequently affecting the optical properties.

The generation/injection of free charge carriers impacts the refractive index n of a semiconductor, which can be estimated using the Drude model through the following expression:

$$\Delta n = -\frac{\lambda^2 e^2}{8\pi^2 c^2 \varepsilon_0 n_0}\left(\frac{\Delta N_e}{\mu_e^*} + \frac{\Delta N_h}{\mu_h^*}\right) \quad (1)$$

where e is the elementary charge, $\varepsilon_0$ is permittivity of vacuum, $\lambda$ is the wavelength, $n_0$ is the unperturbed refractive index of silicon, and $\mu^*_e$ ($\mu^*_h$) is the effective mass of electrons (holes), respectively. The change in the refractive index can be detected by a probe beam in a predetermined wavelength range, e.g., a near-infrared (NIR) wavelength range. Since the energy of the probe beam (e.g., the NIR photons) is lower than the bandgap in silicon, the probe photons do not significantly affect the density of free charge carriers. That is, while the probe beam is being shone on a single photon detection sensor, without incidence of a photon with sufficient energy to kick off the avalanche regime, the probe beam by itself causes no additional changes in the refractive index of the semiconductor material.

In the approach of the present disclosure, the carrier concentration is dramatically amplified using the electron avalanche effect. The light-induced carrier concentration can be amplified several orders of magnitude, up to 100,000 times, so that even absorption of a single photon results in a significant increase in the charge carrier density, substantially affecting the optical properties of the material including its refractive index.

As known to a person having ordinary skill in the art, an electron avalanche occurs in a semiconductor when the material is subjected to a relatively large electric field. In SPADs, it occurs at voltages above the breakdown voltage, which is used for the device operation in the so-called Geiger mode. Under these conditions, a photon-induced electron is accelerated and triggers the creation of additional free electrons into the conduction band, leading to an exponential growth in the concentration of electrons and holes in the semiconductor. The highest electric field occurs within a p-n junction with high doping concentrations of donor (n-doped) and acceptor (p-doped) atoms, creating a multiplication region (MR) where the avalanche develops. When N electrons enter this multiplication region, they generate M×N electrons at the output, where M represents the multiplication factor. For SPADs, the highest M-factor that is routinely achieved reaches the values of up to $10^5$-$10^6$. As a result, an initial single electron produced by an absorption process of a single incident photon causes a change in the free charge carrier concentration of up to $1.2\times10^{17}$ cm$^{-3}$, for M about $10^5$. This change of the carrier concentration corresponds to the refractive index change of $\Delta n \approx -1.1\times10^{-4}$, for M about $10^5$ and $\Delta n \sim -1.1\times10^{-3}$, for M about $10^6$, according to (1). In this work, we employ this effect to detect modulation of the reflected probe beam.

To prove the ability to detect the change in refractive index, an actual reduction to practice in the form of an experiment was carried out. The developed experiment includes a pump-probe setup with two light pulses incident on a commercial SPAD structure (PerkinElmer SPCM-AQR-15). This system is originally designed to intrinsically use the avalanche effect for the detection of single photons. A 100 fs Ti: Sapphire laser system with 80 MHz repetition rate (Mai Tai, Spectra Physics), operating at 810 nm wavelength, seeds an optical parametric oscillator (Oria IR OPO, RADIANTIS). The probe pulses generated from the OPO at a NIR wavelength of 1550 nm are incident onto the SPAD structure, and the reflected signal depends on the changes in the carrier density in the multiplication (avalanche) layer. The strongly down-attenuated split portion of 810 nm Mai Tai output is utilized as an ultra-weak control beam to trigger an electron avalanche within the SPAD structure. The intensity of the reflected probe beam is measured by a standard InGaAs detector (THORLABS, PDA05CF2) using either a lock-in amplifier or an oscilloscope. The SPAD structure is connected to a pulse counter (BK PRECISION 1856D) that recorded the number of avalanche events in the SPAD. The average number of photons per pulse in the control beam is approximated as the ratio of the count rate to the laser repetition rate.

Figures 1B, 1C:
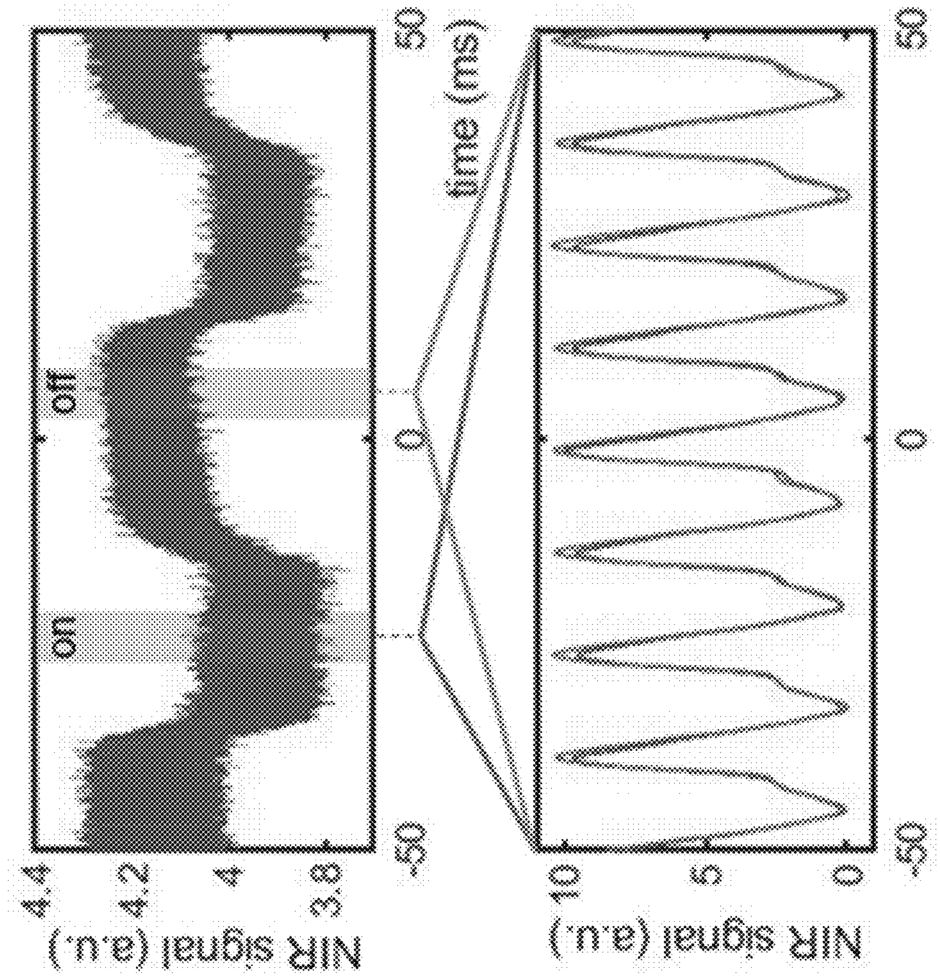
FIG. 1*b* a graph of reflected NIR signal vs. time which shows the near infrared (NIR) probe signal averaged over 100 data sets in the presence/absence (on/off) of the control beam at 810 nm wavelength, with about 0.06 photons per pulse at 1 kHz chopping rate.
FIG. 1*c* is version of FIG. 1*b*, zoomed-in on to the NIR probe signals at the nanosecond time scale averaged over 100 data sets.

Referring to FIG. 1*b*, a graph of reflected NIR signal vs. time is provided which shows the NIR probe signal averaged over 100 data sets in the presence/absence (on/off) of the control beam at 810 nm wavelength, with about 0.06 photons per pulse at 1 kHz chopping rate. FIG. 1*c* is a version of FIG. 1*b*, zoomed-in on to the NIR probe signals at the nanosecond time scale averaged over 100 data sets. The periodic structure reflects NIR laser pulses at 80 MHz. Areas for on/off states clearly show different amplitudes, proving the optical nature of the modulation effect.

Figure 1D:
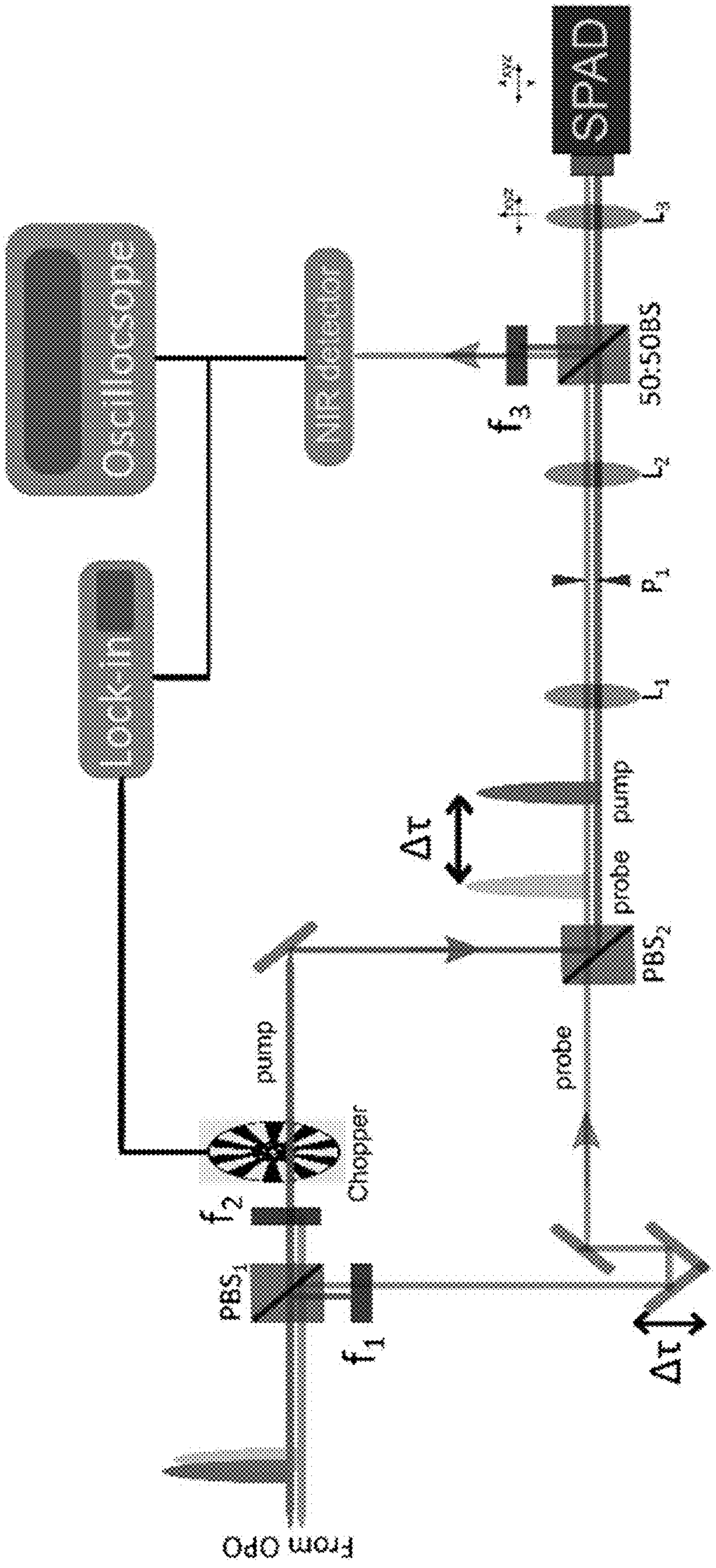
FIG. 1*d* is a schematic of an experimental setup used as an actual reduction to practice to show feasibility of the basis of the present disclosure.

Referring to FIG. 1*d*, a schematic of the experimental setup is shown. The experiment is performed with a pump-probe configuration using a 100 fs 80 MHz pulsed laser system. The pump at 810 nm wavelength from the laser (SPECTRA-PHYSICS MAI TAI HP) is sent into an optical Parametric oscillator OPO (RADIANTIS ORIA IR) to generate the probe pulse at 1550 nm. Beams are separated by a polarizing beam splitter PBS1 (THORLABS PBS204); filters $f_1$ (THORLABS FBH1550-12) and $f_2$ (FESH0900) are used to block the residual wavelengths in the corresponding arms of the interferometer. The pump/control beam in the near-visible (810 nm) in the upper arm of the interferometer is then modulated by a mechanical chopper (THORLABS MC2000B). Half-waveplates combined with a polarizing beam-splitter are installed to control the beam power in both arms (not shown). In addition, to obtain a single-photon level of the pump intensity, it is equipped with a set of neutral density filters. The arm of the probe beam is equipped with a tunable delay to control the temporal separation between the pump and the probe pulses. Two beams are merged again by PBS2 and are sent into an optical filter consisting of two lenses ($L_1$ and $L_2$, 50 mm focal length) and a pinhole ($P_1$, 50 μm diameter). An optical filter is used to clean the spatial modes of the beams and to match the pump and the probe beams in space. After this, both beams are focused on the SPAD structure (PERKINELMER SPCM-AQR-15) through an aspheric lens with numerical aperture (NA) of 0.5 ($L_3$, C240TMD-C). Both elements are mounted on manual xyz translational stages. The probe beam reflected from the structure is being collected into an InGaAs amplified photodetector (THORLABS PDA05CF2) via 50:50 beam splitter BS (Thorlabs CCM1-BS015). Two 1500-nm-wavelength long-pass filters $f_3$ (THORLABS FELH1500×2) before the NIR detector are used to block visible wavelengths in the reflected beam. To protect the SPAD from stray light, the set-up is covered with a tissue impenetrable for light during the experiment. The output of the InGaAs detector is directly measured with a 4 GHz oscilloscope (LECROY WAVEMASTER 804Zi) or with a 100 kHz lock-in amplifier (SRS SR810). A 3.5 GHz frequency counter (BK PRECISION 1856D, not shown in the figure) is used to monitor SPAD clicks. The correctness of the number of clicks has been verified by long waveform measurement on the oscilloscope. The SPAD structure (PerkinElmer SPCM-AQR-15) has a circular active area about 180 μm in diameter and has 55% photon detection efficiency at 810 nm wavelength.

Figure 1E:
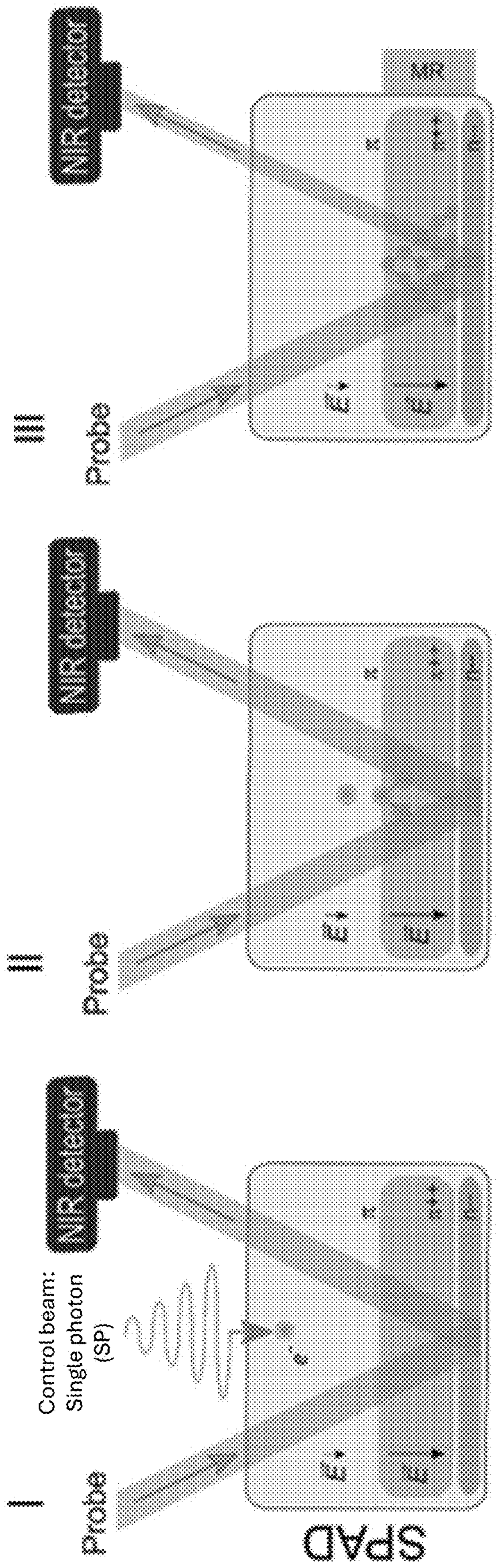
FIG. 1*e* provides schematics of principle of single-photon modulation showing evolution of the avalanche regime, according to the present disclosure.

The principle of single-photon modulation is further depicted in a schematic showing evolution of the avalanche regime shown in FIG. 1*e*: (I) A single photon of the control beam is absorbed and creates a single electron in a conduction band of a semiconductor. The electron is then accelerated towards the multiplication region (MR, p-n junction) by an externally applied electric field. (II) Once in the MR, the electron initiates an avalanche multiplication effect and injects more electrons into the conduction band. (III) An avalanche of electrons causes a significant change in the free charge carrier concentration and, subsequently, in the refractive index, altering/modulating the intensity of a reflected NIR probe beam.

Referring back to FIGS. 1*b* and 1*c*, we observed a modulation of a NIR probe beam by strobing the weak visible control beam with a mechanical chopper at 20-1000 Hz frequency range. The modulation of the probe beam was detected for the control beam with a mean photon number per pulse in a range 0.0005-0.1 photons. Approximating the pulsed laser as a coherent source, the number of photons in the pulse of the control beam obeys the Poisson distribution. The probability of m photons is $$p_m = e^{-\langle m \rangle} \frac{\langle m \rangle^m}{m!},$$

where $\langle m \rangle$ is the mean number of photons per pulse. For $\langle m \rangle$ value of about 0.06, the probability of detecting two photons $p_2$ is approximately 16 times lower compared to the probability of detecting a single photon $p_1$, which is effectively equivalent to intensities of a source of single photons. This change happens because of the saturation of counts due to SPAD's dead time and limitation of pulse counter. In this regard, all values for the average number of photons $\langle m \rangle$ are corrected to account for these effects.

Figure 2A:
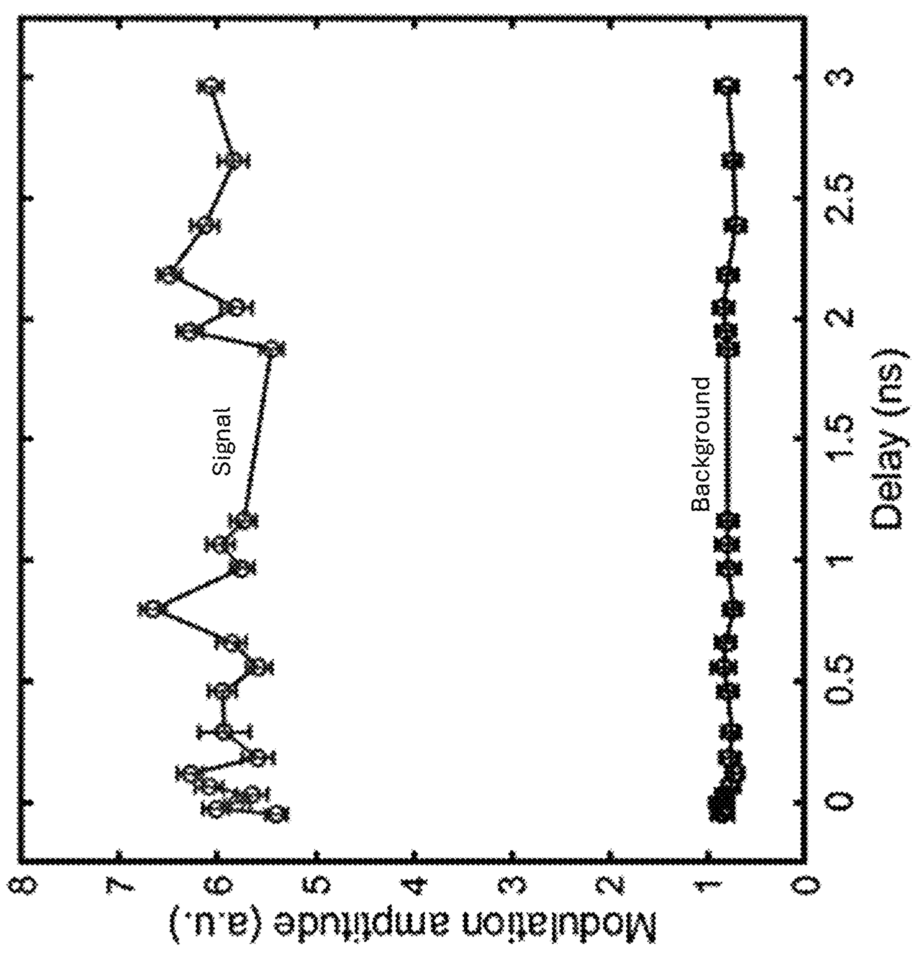
FIG. 2*a* is a graph of modulation amplitude vs. delay in ns showing the amplitude of NIR power modulation as a function of the time delay between the control beam and probe pulses.

In a typical SPAD onset of an avalanche develops within sub-ns time scales after incidence of a single photon. To study the time response, we conducted pump-probe measurements with a variable time delay between pulses. We found that the observed probe beam modulation has little-to-no dependence on the time delay between the control beam and the probe pulses in the relatively broad range of −0.1 to 3 ns as shown in FIG. 2*a*. This independence implies that the characteristic time of the avalanche cycle, from rising to quenching, is comparable to or larger than the time separation between two subsequent pulses.

The avalanche excitation and relaxation rates can be substantially sped up in specially designed all-optical schemes of modulation. In standard SPADs, the current initiated by a single photon develops on a picosecond time scale limited mainly by the capacitance of a diode in an RC-circuit. However, as mentioned above, the time required to suppress this current and bring the detector to its initial state (the dead time) is on the order of tens of nanoseconds. During the dead time the detector is not capable of capturing new photons. In this scheme, the dead time is the bottleneck for getting faster rates. Yet, the dead time could be potentially much shorter in a scheme for an all-optical modulation. To achieve this, instead of measuring the "global" current from the whole SPAD, such an optical scheme should be sensitive to the local density of charges, which evolves at a faster time scale, enabling THz rates of operation. For example, the generated $$\frac{\lambda}{2n_0 v} \approx 3ps$$

electron transits a diffraction-limited region of the probe beam within approximately for $\lambda$=1550 nm wavelength, refractive index of silicon $n_0$=3.5 and drift velocity of electrons $v=10^7$ cm/s.[43] Achieving such a time scale would require a design optimized for measurements of the local currents. A mechanism of avalanche suppression would still be needed in this case, which could be realized through a different SPAD design. We also note that the dynamics can be further boosted for materials with higher mobilities and a shorter carrier lifetime, such as GaAs.

While a single device for detecting incidence of single photon may be blind to a second incident photon during the deadtime of the device, an array of such devices can be used to substantially increase the likelihood of a second such device detecting incidence of a second incident photon during the deadtime of a first device.

Figure 1F:
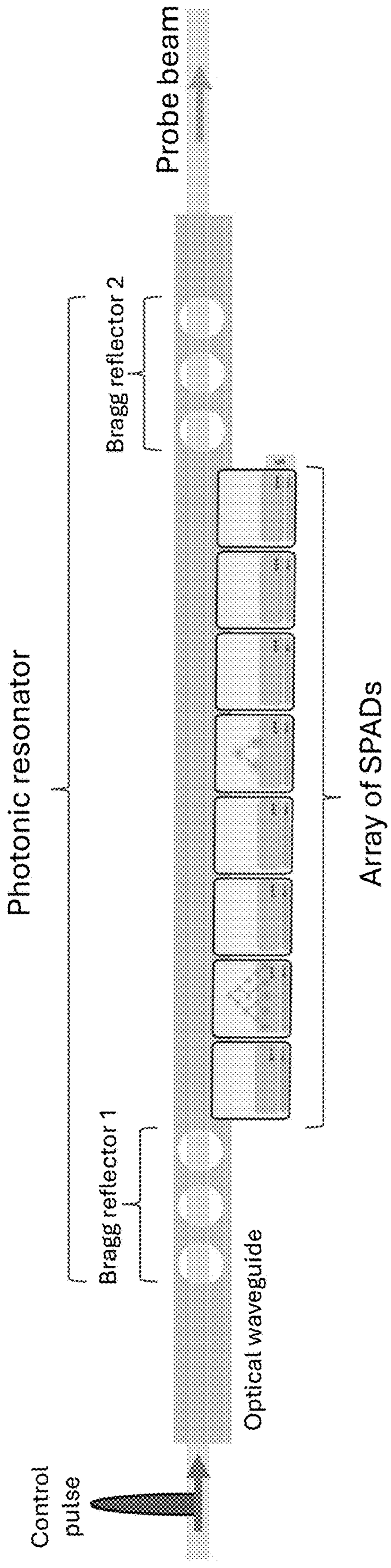
FIG. 1*f* is a schematic of an example array of devices, according to the present disclosure.
Figure 1G:
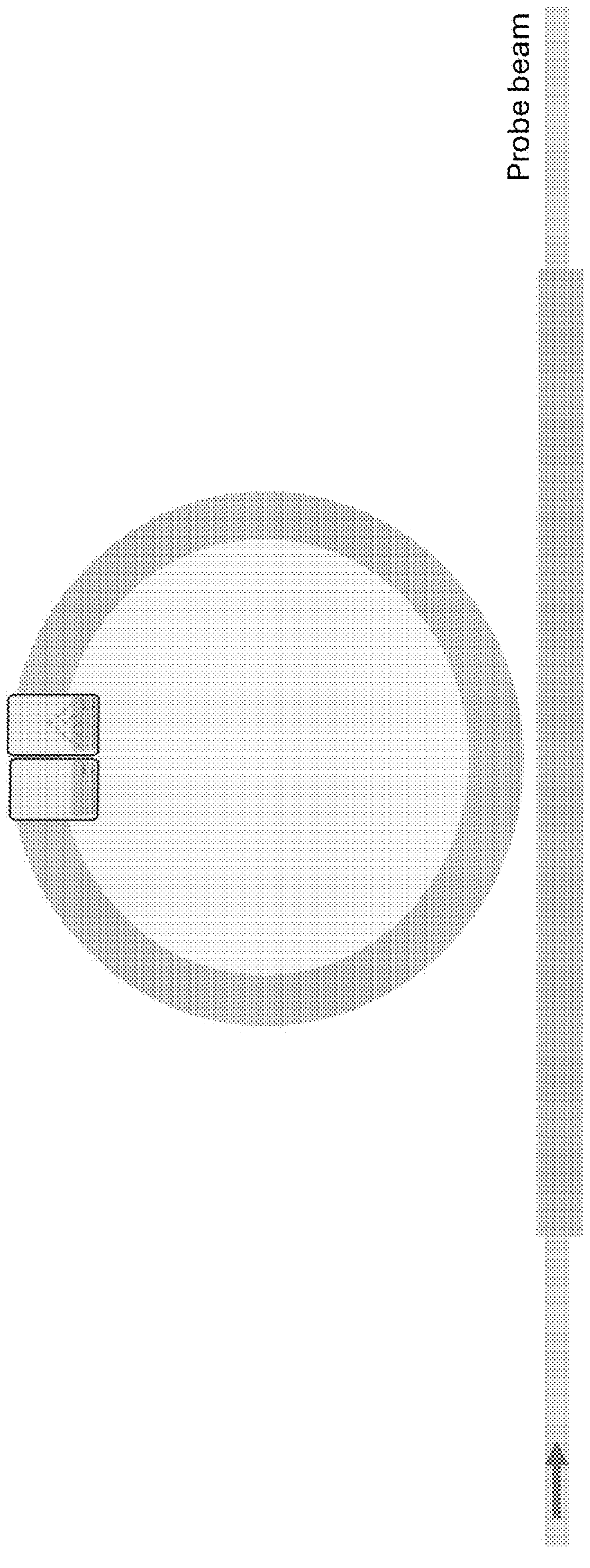
FIG. 1g is a schematic of a similar arrangement as in FIG. 1*f* is provided but instead in a ring resonance manner.

Referring to FIG. 1*f*, a schematic of an example array of devices according to the present disclosure is provided. According to FIG. 1*f*, an array of single-photon avalanche detectors, e.g., SPADs, is coupled to a waveguide-based photonic resonator, which is in resonance with a probe beam wavelength. The resonator enhances the sensitivity of the probe beam to a change of the refractive index in one or several of the SPADs during the electronic avalanche process. Each pixel of an array is a corresponding SPAD. Using an array of SPADs allows the detection of photons from the control beam within the dead time of a single SPAD. The incoming photon is propagating through each pixel of the array, having small probability of being absorbed in any of them. Once it is absorbed, the corresponding pixel cannot participate in further photon detection during the dead time of the absorbing SPAD. However, since the probability of absorption for any pixel in a chain is low (i.e., about 1/Number of pixels), the next photon with a much higher probability will be detected by other pixels, which allows detection of photons while the first pixel is blinded by the first photon. The scheme allows to significantly reduce the dead time of the modulator bringing to tens of ps deadtime level for low-power light. Referring to FIG. 1*g*, schematic of a similar arrangement as in FIG. 1*f* is provided but instead in a ring resonance manner.

Figure 1H:
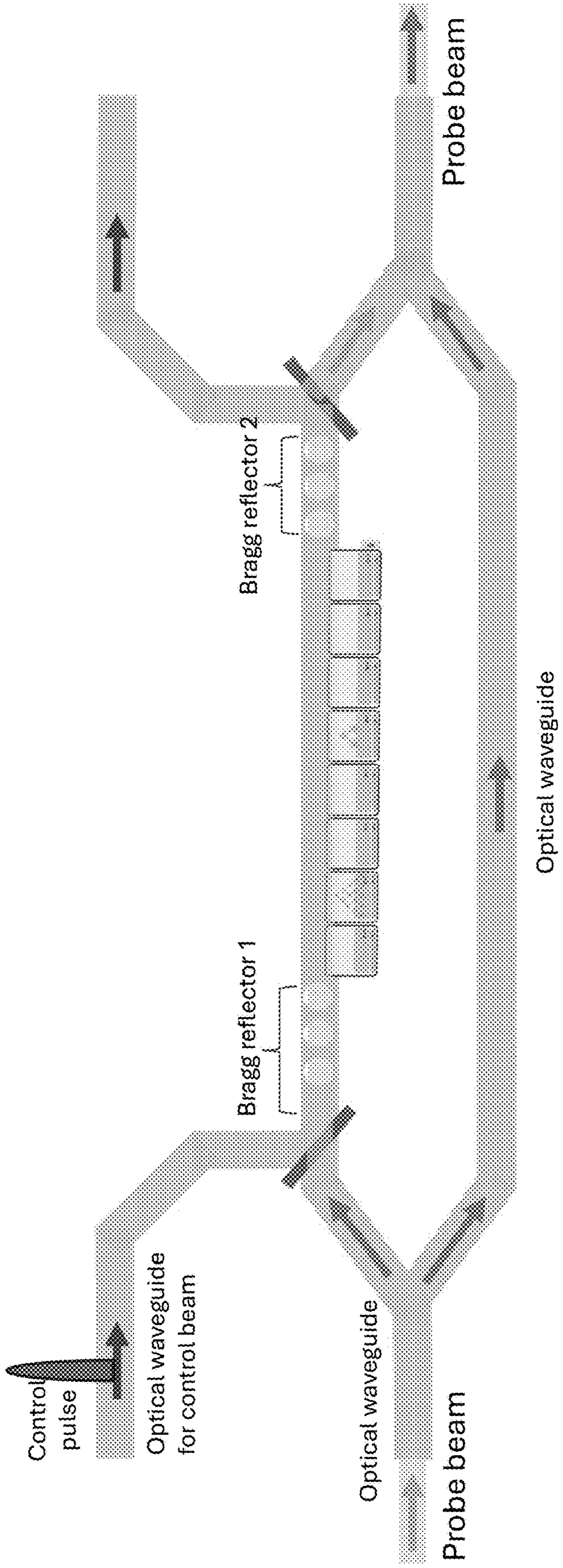
FIG. 1*h* is yet another schematic, known in the art as a Mach-Zehnder interferometric scheme, for an all-optical modulator with a higher extinction ratio (re), for switching.

Referring to FIG. 1*h*, yet another schematic for an all-optical modulator with a higher extinction ratio (re), which is the ratio of two optical power levels generated by an optical source, known in the art as a Mach-Zehnder interferometric scheme, for switching is presented. For a higher extinction ratio, a Mach-Zehnder interferometer scheme can be realized. The upper arm shown in FIG. 1*h* of the interferometer is a standard modulator. The upper arm is coupled to both control and probe beams, while the second arm is for the probe beam only. When the photon from a control beam arrives and triggers an avalanche, it causes a change in both phase and amplitude. If the output probe beam from the upper arm overlaps with the probe beam from the bottom arm, the overall output signal depends on interference between these two. Since the resultant interference depends on both values-phase and amplitude—the scheme demonstrates a much higher extinction ratio compared to other schemes.

Referring to FIG. 2*a*, a graph of modulation amplitude vs. delay between the control beam and probe pulses in ns is presented. The amplitude of NIR power modulation as a function of the time delay between the control beam and probe pulses.

It should be noted that while the avalanche rise time is in the sub-nanosecond range, the recovery time (dead time) is controlled by the speed of quenching circuit and it is typically on the order of several tens of nanoseconds, which is consistent with the results presented in FIG. 2*a*.

Figure 2B:
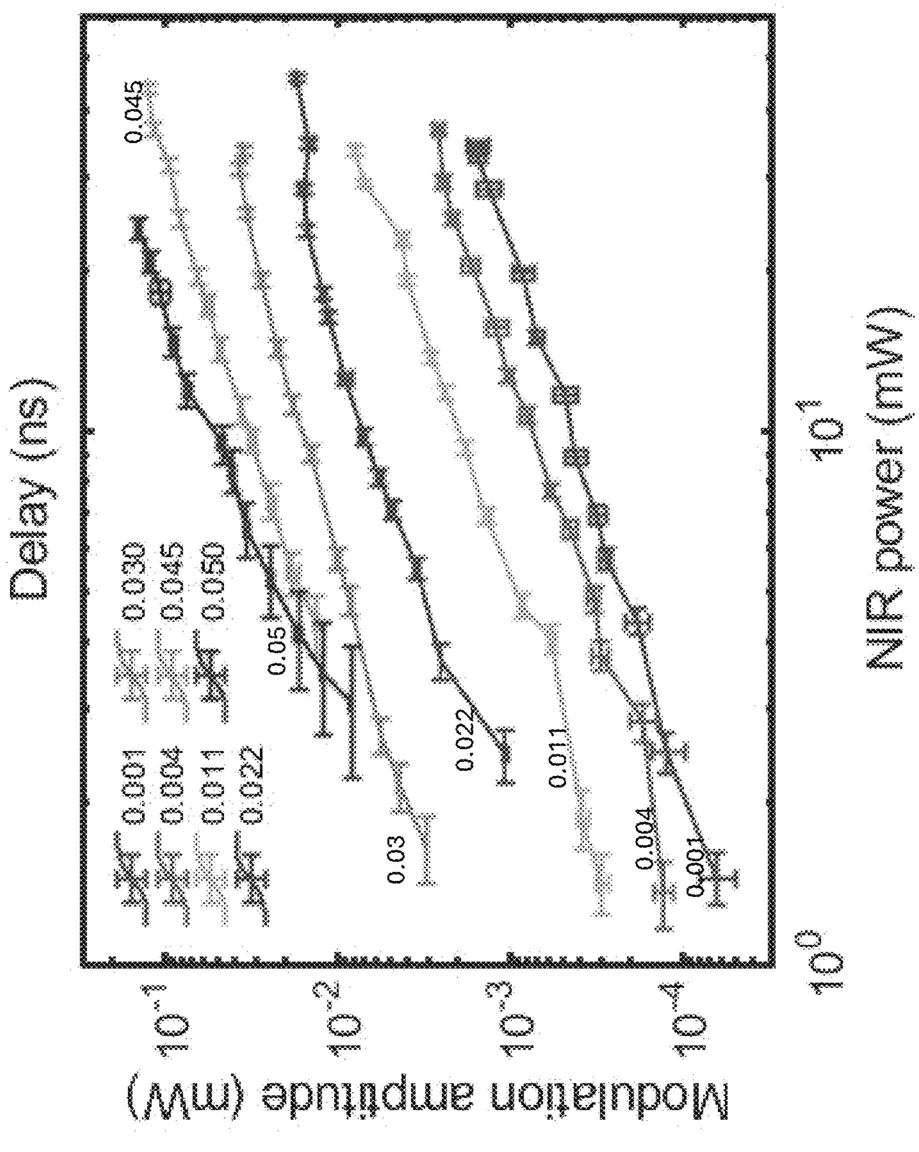
FIG. 2*b*, is a graph of modulation amplitude in mW vs. NIR power in mW showing modulation of the reflected NIR signal as a function of the NIR probe beam intensity for different numbers of photons per pulse in the control beam.
Figure 2C:
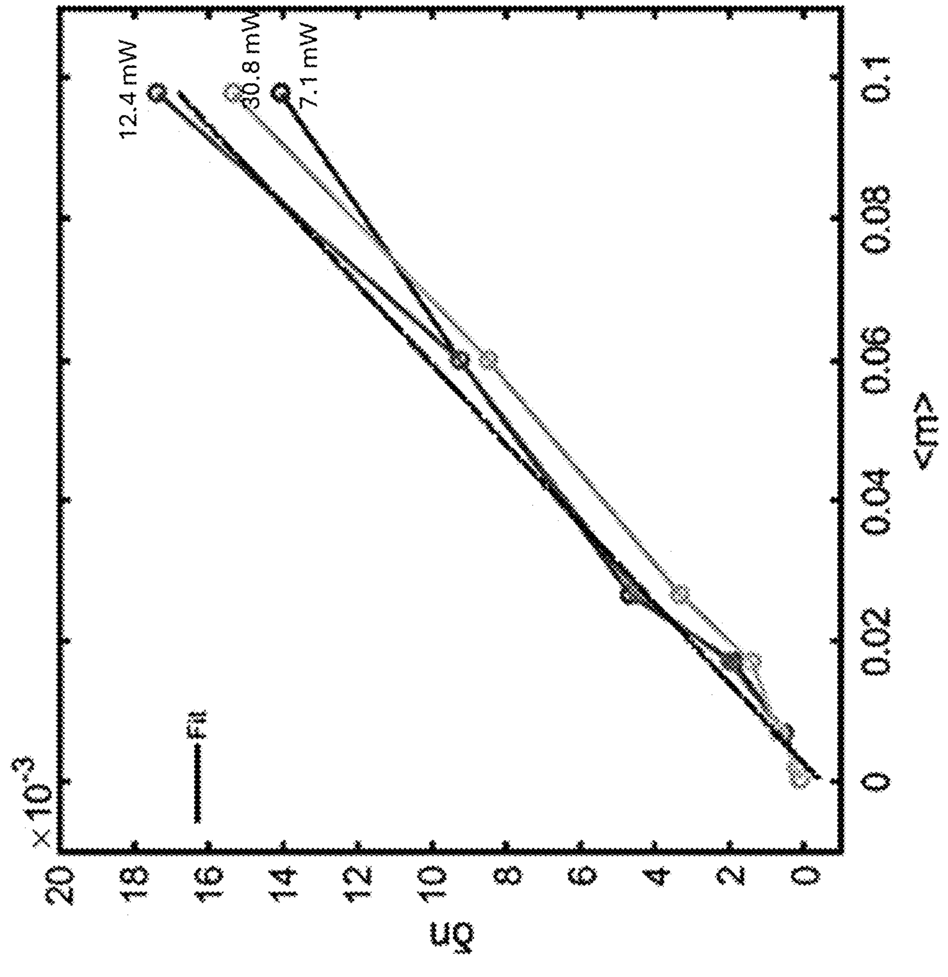
FIG. 2*c* is a graph of amplitude of the refractive index modulation &n measured at different powers of the probe beam.

Referring to FIG. 2*b*, modulation of the reflected NIR signal as a function of the NIR probe beam intensity for different numbers of photons per pulse in the control beam (m) is provided. The range is between To understand the sensitivity of the structure to a control beam of low-photon-number intensity, we measured the amplitude of the NIR probe beam modulation as a function of the intensities of the control beam and probe beams at 1 KHz chopper's frequency, with the probe pulse delayed by one nanosecond. The modulation depth increases almost linearly with the power of the NIR probe beam as shown in FIG. 2*c*. Referring to FIG. 2*c*, amplitude of the refractive index modulation &n measured at different powers of the probe beam is provided. Lines connecting experimental points are guides for the eye. As expected, the higher intensity of the probe beam improves the signal-to-noise ratio. However, it creates higher additional counts on the SPAD, which can be significant even for a NIR probe at 1550 nm wavelength. The amplitude of the probe modulation grows linearly with increasing the number of photons (m) in the control beam pulse.

The amplitude of the refractive index modulation &n is evaluated through the relative modulation of the reflectivity. Generally, the reflection from a structure depends on the combination of various effects including interference inside the structure, the change in the light absorption coefficient, and the change of the refractive index. It should be noted that change of the refractive index plays a dominant role in modulation of the reflectivity. Consequently, the difference in the refractive index can be evaluated using the standard Fresnel formulas for reflectivity, which, to the first order of approximation, provides:

$$\delta n \cong -\frac{1}{4}\left(n_0^2 - 1\right)\delta R/R,$$

where $n_0$ is the refractive index of silicon,

R is the reflectivity, and

δR is the amplitude of the reflectivity modulation. The value of δn shows a linear dependence on the control beam's intensity. These curves remain essentially unchanged for two substantially different powers of the probe beam, which is consistent with the modulation that originates from the change in the single-interface Fresnel reflection proving that our assumption is valid.

The highest observed value for the refractive index modulation is about $1.7\times10^{-2}$. According to (1) this level corresponds to the free charge carrier concentration modulation of about $3.2\times10^{19}$ cm$^{-3}$, which is shown for the average number of photons (m)=0.1 per pulse. This change is about two orders of magnitude higher than $1.2\times10^{17}$ cm$^{-3}$ estimated for a single photon, which happens due to the charge accumulation over several pulses. By analogy to the Kerr optical nonlinearity, the change of the refractive index is proportional to the intensity of the beam $\delta n=n_2I$. One important difference is that the system and methods of the present disclosure shows a significant index change even at much lower intensities. The estimate for $n_2$ coefficient for a single photon gives a value around $7\times10^{-3}$ m$^2$W$^{-1}$, which is several orders of magnitude larger compared to best nonlinear optical materials, exceeding by more than two orders of magnitude even with the largest refractive index $n_2$ value provided in Table 1.

The method's sensitivity according to the present disclosure can be enhanced by incorporating SPAD structure into photonic resonators, such as 1D photonic crystals, known to a person having ordinary skill in the art and ring resonators. The first can be defined by a lower mode volume. Therefore, it is more sensitive at a faster time response. Q-factor of 1500 is low enough for detecting events with 10 ps time resolution. At the same time, it allows the achieving of single-photon sensitivity in a single-shot manner. The shift of the resonant wavelength with length of the cavity l=0.8 μm and n=3.5 for silicon is about 1.5 nm, while the Full width at half maximum (FWHM) for this q-factor is about 0.5 nm. Thus, an introduction of a simple cavity would allow complete transmission suppression with a single photon control beam without sacrificing speed.

AS discussed above, while silicon-based SPADs can be used, GaAs can be used as an alternative option. This material has been demonstrated to have the electron avalanche effect. As compared to silicon, it has a direct bandgap, which can be critical for achieving higher speed.

Furthermore, as discussed above, while the present disclosure mentions NIR probe beams numerous times, it should be appreciated that other probe beams can be implemented. Additionally, other materials for working at NIR can be used, such as InGaAs/InP. In this case, a control beam can have a wavelength in the range of about 1-2 μm, and the probe beam can have a wavelength range of about 2.5-4 μm.

Those having ordinary skill in the art will recognize that numerous modifications can be made to the specific implementations described above. The implementations should not be limited to the particular limitations described. Other implementations may be possible.

The invention claimed is:

1. An ultrafast system for detecting incidence of a single photon, comprising:

a single photon avalanche detector having an inherent bandgap;

a source of probe light configured to apply an incident beam onto the single photon avalanche detector, wherein the probe light is configured to apply energy less than the bandgap; and a probe beam detector, configured to receive a reflected probe beam from the single photon avalanche detector, wherein the probe beam detector is adapted to generate a signal signifying: i) incidence of a single photon onto the single photon avalanche detector based on changes to concentration of free electrons in the single photon avalanche detector as a result of the onset of an avalanche regime, and ii) modulation of the reflected probe beam as a result of the changes to the concentration of free electrons in the single photon avalanche detector as a result of the onset of the avalanche regime.

2. The ultrafast system for detecting incidence of a single photon of claim 1, wherein the onset of the avalanche regime represents an initial state of the single photon avalanche detector entering an avalanche mode based on the incidence of the single photon.

3. The ultrafast system for detecting incidence of a single photon of claim 1, wherein the single photon avalanche detector is a single photon avalanche diode.

4. The ultrafast system for detecting incidence of a single photon of claim 1, wherein the source of probe light is a near infrared (NIR) source and the probe beam detector is configured to detect the reflected probe beam at NIR wavelength.

5. The ultrafast system for detecting incidence of a single photon of claim 3, wherein the probe beam detector is adapted to generate the signal associated with the changes to concentration of free electrons and holes between about 3 ps and about 500 ps after incidence of the single photon.

6. The ultrafast system for detecting incidence of a single photon of claim 3, wherein the probe beam detector is adapted to generate the signal associated with the changes to concentration of free electrons based on refractive index change of about $1.7\times10^{-2}$ within the avalanche layer of the single photon avalanche detector in response to the incidence of the single photon thereon.

7. The ultrafast system for detecting incidence of a single photon of claim 1, wherein the single photon is sourced from light having a wavelength between about 400 nm to 1000 nm.

8. A method of detecting an incidence of a single photon onto a device, comprising:

applying a probe light onto a device having a bandgap, wherein the device includes a P-N junction maintained in a reverse bias and adapted to initiate an avalanche mode of freeing valence electrons and holes based on incidence of a single photon thereon, and wherein the probe light is configured to apply energy less than the bandgap;

receiving the reflected probe light from the device by a probe light detector;

applying a single photon from a control beam to the device from a control beam;

detecting changes in the device by the probe light detector as the device goes into an avalanche regime, wherein the changes correspond to a time delay between the incidence of the single photon onto the device causing a change in concentration of free electrons and holes in the device.

9. The method of claim 8, wherein the device is a single photon avalanche diode (SPAD).

10. The method of claim 8, wherein the source of the probe light is a near infrared (NIR) source and the probe light detector is configured to detect the reflected probe light at NIR wavelength.

11. The method of claim 8, wherein the onset of the avalanche regime represents an initial state of the device entering an avalanche mode based on the incidence of the single photon.

12. The method of claim 8, wherein the probe light detector is adapted to generate a signal associated with the changes to concentration of free electrons and holes between about 3 ps and about 500 ps after incidence of the single photon.

13. The method of claim 8, wherein the probe light detector is adapted to generate a signal associated with the changes to concentration of free electrons and holes based on refractive index change of about $1.7\times10^{-2}$ within an avalanche layer of the device in response to the incidence of the single photon thereon.

14. The method of claim 8, wherein the single photon is sourced from light having a wavelength between about 400 nm to 1000 nm.

15. The method of claim 8, wherein the device is a silicon-based device.

16. A method of detecting modulations of optical properties of a device, comprising:

applying a probe light onto a device having a bandgap, wherein the device includes a P-N junction maintained in a reverse bias and adapted to initiate an avalanche regime of freeing valence electrons and holes based on the incidence of a single photon thereon, and wherein the probe light is configured to apply energy less than the bandgap;

receiving reflected probe light from the device by probe light detector;

applying a single photon from a control beam to the device;

detecting fast modulations in the reflected probe light as the device initiates an avalanche regime, wherein the modulations correspond to changes in the device in response to the incidence of the single photon.

17. The method of claim 16, wherein the device is a single photon avalanche diode (SPAD).

18. The method of claim 16, wherein the onset of the avalanche regime represents an initial state of the device entering an avalanche mode based on the incidence of the single photon.

19. The method of claim 16, wherein the source of the probe light is a near infrared (NIR) source and the probe light detector is configured to detect the reflected probe light at NIR wavelength.

20. The method of claim 16, wherein the probe light detector is adapted to generate a signal associated with the fast modulations in the reflected probe light between about 3 ps and about 500 ps after incidence of the single photon.

21. The method of claim 16, wherein the probe light detector is adapted to generate a signal associated with the fast modulations in the reflected probe light based on refractive index change of about $1.7\times10^{-2}$ within an avalanche layer of the device in response to the incidence of the single photon thereon.

22. The method of claim 16, wherein the single photon is sourced from light having a wavelength between about 400 nm to 1000 nm.

23. The method of claim 16, wherein the device is a silicon-based device.

* * * * *